United States Patent
Hewson et al.

(10) Patent No.: US 10,864,983 B2
(45) Date of Patent: Dec. 15, 2020

(54) RIB ARRANGEMENT IN A WING TIP DEVICE

(71) Applicant: AIRBUS OPERATIONS LIMITED, Bristol (GB)

(72) Inventors: Richard Hewson, Bristol (GB); William Tulloch, Bristol (GB)

(73) Assignee: Airbus Operations Limited, Bristol (GB)

( * ) Notice: Subject to any disclaimer, the term of this patent is extended or adjusted under 35 U.S.C. 154(b) by 331 days.

(21) Appl. No.: 15/889,383

(22) Filed: Feb. 6, 2018

(65) Prior Publication Data

US 2018/0237127 A1    Aug. 23, 2018

(30) Foreign Application Priority Data

Feb. 17, 2017    (GB) .................................. 1702588.3

(51) Int. Cl.
| | | |
|---|---|---|
| *B64C 23/06* | (2006.01) | |
| *B64C 3/18* | (2006.01) | |
| *B64F 5/00* | (2017.01) | |
| *B64C 3/58* | (2006.01) | |

(52) U.S. Cl.
CPC ............ *B64C 23/069* (2017.05); *B64C 3/187* (2013.01); *B64F 5/00* (2013.01); *B64C 3/58* (2013.01); *Y02T 50/10* (2013.01)

(58) Field of Classification Search
CPC ....... B64C 23/069; B64C 23/04; B64C 3/187; B64C 3/58; B64F 5/00; Y02T 50/164
See application file for complete search history.

(56) References Cited

U.S. PATENT DOCUMENTS

| | | | |
|---|---|---|---|
| 5,407,153 A | 4/1995 | Kirk et al. | |
| 2002/0092947 A1* | 7/2002 | Felker | B64C 23/069 |
| | | | 244/35 R |
| 2002/0162917 A1* | 11/2002 | Heller | B64C 3/10 |
| | | | 244/199.4 |
| 2009/0084904 A1 | 4/2009 | Detert | |
| 2012/0112005 A1 | 5/2012 | Chaussee et al. | |
| 2013/0277504 A1* | 10/2013 | Heller | B64C 23/069 |
| | | | 244/35 R |
| 2014/0117166 A1 | 5/2014 | Campbell, Jr. et al. | |

FOREIGN PATENT DOCUMENTS

| | | |
|---|---|---|
| DE | 10 2010 014633 | 10/2011 |
| WO | 2014/065718 | 5/2014 |

OTHER PUBLICATIONS

European Search Report cited in EP 18 15 6811.4 dated Jun. 8, 2018, 8 pages.
Combined Search and Examination Report cited in GB 1702588.3, dated Jul. 20, 2017, six pages.

\* cited by examiner

*Primary Examiner* — Rodney A Bonnette
(74) *Attorney, Agent, or Firm* — Nixon & Vanderhye P.C.

(57) ABSTRACT

An aircraft (1) having a wing (3) and a wing tip device (4) at the tip of the wing (3), wherein the wing tip device (4) includes a rib (16) positioned in a span wise region (C) of the wing tip device (4) in which transonic flow occurs when the aircraft (1) is in flight. A method of designing an aircraft (1) including predicting where transonic flow occurs on the wing tip device (4) when the aircraft (1) is in flight, and designing the wing tip device (4) with a rib (16) positioned in the span wise region (C) of the wing tip device (4) in which the predicted transonic flow occurs.

17 Claims, 4 Drawing Sheets

RIB ARRANGEMENT IN A WING TIP DEVICE

RELATED APPLICATION

This application claims priority to United Kingdom (GB) Patent Application 1702588.3 filed Feb. 17, 2017, the entirety of which is incorporated by reference.

BACKGROUND OF THE INVENTION

The present invention relates to an aircraft having a wing tip device and to a wing tip device. The present invention also relates to a method of design of an aircraft having a wing tip device and to a method of design of a wing tip device. The present invention also relates to a method of manufacture of an aircraft having a wing tip device and to a method of manufacture of a wing tip device. The present invention further relates to a method of use of an aircraft having a wing tip device.

Wing tip devices are used to improve the efficiency of fixed wing aircraft, predominantly by reducing lift induced drag. Although this may increase the profile drag, the overall lift to drag ratio is increased. This increases fuel efficiency, which is particularly important with passenger aircraft.

Wing tip devices are relatively complex structures to design and build as they are subject to differing flows at different positions along the wing tip device. This can present a number of design obstacles.

The present invention seeks to address or mitigate at least some of the above mentioned problems. Alternatively, or additionally, the present invention seeks to provide an improved aircraft having a wing tip device. Alternatively, or additionally, the present invention seeks to provide an improved wing tip device for an aircraft. Alternatively, or additionally, the present invention seeks to provide an improved method of designing an aircraft having a wing tip device. Alternatively, or additionally, the present invention seeks to provide an improved method of designing a wing tip device for an aircraft. Alternatively, or additionally, the present invention seeks to provide an improved method of manufacture of an aircraft having a wing tip device. Alternatively, or additionally, the present invention seeks to provide an improved method of manufacture of a wing tip device for an aircraft. Alternatively, or additionally, the present invention seeks to provide an improved method of use of an aircraft.

SUMMARY OF THE INVENTION

According to a first aspect of the invention there is provided an aircraft comprising a wing and a wing tip device at the tip of the wing, wherein the wing tip device comprises a rib positioned in a span wise region of the wing tip device in which transonic flow occurs when the aircraft is in flight.

Positioning a rib in a span wise region of the wing tip device in which transonic flow occurs is advantageous in that it may provide structural reinforcement against pressure forces exerted on the wing tip device in the transonic region, for example due to a shock wave occurring in flight. Furthermore, providing specific structural reinforcement in the transonic region may provide a relatively light weight and compact way of reinforcing a wing tip device against pressure forces exerted in the transonic region, for example due to a shock-wave.

In embodiments of the invention, the aircraft is configured to fly at an operating cruise speed and the rib is positioned in a span wise region of the wing tip device in which transonic flow occurs when the aircraft is flying at that operating cruise speed. In embodiments of the invention the operating cruise speed is a subsonic speed. The operating cruise speed may be in the range Mach 0.80 to Mach 0.89, for example.

In embodiments of the invention, the aircraft is configured to fly at the operating cruise speed at an operating cruise altitude and the rib is positioned in a span wise region of the wing tip device in which transonic flow occurs when the aircraft is flying at the operating cruise speed and operating cruise altitude.

The operating cruise altitude may be in the range 30,000 feet to 43,000 feet, for example.

It will be appreciated that operating cruise speed is a speed that the aircraft is designed to cruise at in flight, i.e. at a constant altitude and constant speed, over long distances. The operating cruise speed and operating cruise altitude may be such that flying at the operating cruise speed, at the operating cruise altitude, provides the highest fuel efficiency for the operation of the aircraft.

It will be appreciated that the rib is positioned 'in a span wise region of the wing tip device in which transonic flow occurs' in that it is positioned within the span wise extent of the region of transonic flow. However this does not require that it is exposed to the flow. In this respect, in embodiments of the invention the rib is an internal structural rib of the wing tip device.

In embodiments of the invention the rib is arranged to provide structural reinforcement against pressure forces exerted on the wing tip device due to the transonic flow.

In embodiments of the invention the rib is arranged to provide structural reinforcement against pressure forces exerted on the wing tip device due to a shock wave.

Optionally the rib is positioned at the span wise location at which a shock wave occurs during flight.

In embodiments of the invention the rib is positioned at the span wise location at which a shock wave occurs when the aircraft is flying at the operating cruise speed. In embodiments of the invention the rib is positioned at the span wise location at which a shock wave occurs when the aircraft is flying at the operating cruise speed and the operating cruise altitude.

Optionally the rib is arranged to increase the stiffness of the wing tip device.

In embodiments of the invention the wing tip device comprises a wing skin and the rib is arranged to increase the stiffness and/or strength of the wing skin.

Optionally the rib is arranged to increase the stiffness of the wing tip device in the direction of the depth of the wing tip device. Optionally the rib is arranged to increase the stiffness of the wing tip device in a direction perpendicular to the mean camber line and to the local span wise direction.

Optionally the rib is arranged to increase the stiffness of the wing tip device in the chord wise direction of the wing tip device.

Optionally the rib is arranged to increase the stiffness of the wing tip device in the direction of twisting of the wing tip device about the span wise direction in which the wing tip device extends. In this regard, optionally the rib is arranged to maintain the camber of the wing tip device.

Optionally the wing tip device comprises a pair of spars that are spaced apart in the chord wise direction and wherein the rib links the pair of spars. Optionally the pair of spars are front and rear spars of the wing tip device.

Optionally the rib forms an outboard rib and the wing tip device further comprises an inboard rib. Optionally the inboard rib is located towards the inboard end of the wing tip device. In embodiments of the invention the wing tip device is attached, at its inboard end, to the tip of the wing.

Optionally the inboard rib links the pair of spars. Optionally the outboard rib, the spars and the inboard rib together form a structural support frame of the wing tip device.

Optionally the rib is substantially aligned in the direction of flight of the aircraft. Optionally the rib is substantially aligned in the local chord wise direction of the wing tip device.

In embodiments of the invention the wing tip device is arranged to reduce induced drag on the wing. Optionally the wing tip device comprises a winglet. Alternatively, or additionally, the wing tip device may comprise a wing tip fence, a raked wing tip or a wing tip extension, for example. Optionally the wing tip device extends upwardly as it extends outboard in the span wise direction. Optionally the wing tip device is curved along its length in the span wise direction. Optionally the wing tip device is swept back.

The aircraft may be any air vehicle such as a manned aircraft or a UAV. The aircraft may be a passenger aircraft which may include a passenger cabin having rows and columns of seat units for passengers. The aircraft may have a capacity of at least 20 passengers, at least 50 passengers, or more than 50 passengers. The aircraft may be a powered aircraft having an engine, such as a turbofan, for propelling the aircraft. The aircraft engines may be wing-mounted and be mounted below the wings.

According to a second aspect of the invention there is provided a wing tip device for use as the wing tip device of the first aspect of the invention.

According to a third aspect of the invention there is provided a wing tip device for use with a wing of an aircraft, the wing tip device comprising a rib positioned in a span wise region of the wing tip device in which transonic flow occurs when the aircraft is in flight.

According to a fourth aspect of the invention there is provided an aircraft comprising a wing and a wing tip device at the tip of the wing, wherein the wing tip device comprises a pair of spars that are spaced apart in the chord wise direction, an inboard rib that links the spars and an outboard rib that links the spars, wherein the outboard rib is positioned in a span wise region of the wing tip device in which transonic flow occurs when the aircraft is in flight.

Optionally the outboard rib is positioned at the span wise location at which a shock wave occurs during flight.

According to a fifth aspect of the invention there is provided a method of designing an aircraft comprising a wing and a wing tip device at the tip of the wing, the method comprising:
  (i) Predicting where transonic flow occurs on the wing tip device when the aircraft is in flight, and
  (ii) Designing the wing tip device with a rib positioned in the span wise region of the wing tip device in which the predicted transonic flow occurs.

Optionally step (i) comprises predicting where transonic flow occurs on the wing tip device when the rib is not in place and wherein the method comprises:
  (iii) Repeating step (i) with the rib in place, to obtain a revised prediction;
  (iv) Repeating step (ii) to locate the rib at the revised location;
  (v) Iteratively repeating steps (iii) and (iv) until a final design is obtained.

Optionally steps (iii) and (iv) are iteratively repeated in order to take into account the structural response of the wing tip device to the transonic flow. This may include the aero-elastic response of the wing tip device.

Optionally step (i) comprises predicting where transonic flow occurs on the wing tip device when the aircraft is flying at an operating cruise speed.

Optionally step (i) comprises using mathematical techniques to model the airflow, for example computational fluid dynamics.

Optionally step (ii) comprises designing the wing tip device with the rib positioned at the span wise location at which a shock wave occurs during flight.

In embodiments of the invention the method comprises designing the rib to provide structural reinforcement against pressure forces exerted on the wing tip device due to the transonic flow.

In embodiments of the invention the method comprises designing the rib to provide structural reinforcement against pressure forces exerted on the wing tip device due to a shock wave.

Optionally step (ii) comprises designing the wing tip device with a pair of spars that are spaced apart in the chord wise direction and with the rib linking the pair of spars.

Optionally the rib is an outboard rib and step (ii) comprises designing the wing tip device with an inboard rib. The inboard rib may link the pair of spars. The inboard rib may be located towards the inboard end of the wing tip device. Optionally, the outboard rib, the spars and the inboard rib together form a structural support frame of the wing tip device.

Optionally the rib is substantially aligned in the direction of flight of the aircraft.

Alternatively, step (i) may comprise predicting where transonic flow occurs on the wing tip device when the rib is in place.

According to a sixth aspect of the invention there is provided a method of manufacture of an aircraft comprising a wing and a wing tip device at the tip of the wing, the method comprising:
  (i) Designing an aircraft according to the method of the fifth aspect of the invention, and
  (ii) Manufacturing the designed aircraft to that design.

According to a seventh aspect of the invention there is provided a method of designing a wing tip device for an aircraft, the method comprising:
  (i) Predicting where transonic flow occurs on the wing tip device when the aircraft is in flight, and
  (ii) Designing the wing tip device with a rib positioned in the span wise region of the wing tip device in which the predicted transonic flow occurs.

Optionally step (i) comprises predicting where transonic flow occurs on the wing tip device when the rib is not in place and wherein the method comprises:
  (iii) Repeating step (i) with the rib in place, to obtain a revised prediction;
  (iv) Repeating step (ii) to locate the rib at the revised location;
  (v) Iteratively repeating steps (iii) and (iv) until a final design is obtained.

Optionally steps (iii) and (iv) are iteratively repeated in order to take into account the structural response of the wing tip device to the transonic flow. This may include the aero-elastic response of the wing tip device.

Optionally step (ii) comprises designing the wing tip device with the rib positioned at the span wise location at which a shock wave occurs during flight.

According to an eighth aspect of the invention there is provided a method of manufacture of a wing tip device for an aircraft comprising:
(i) Designing a wing tip device according to the method of the seventh aspect of the invention, and
(ii) Manufacturing the designed wing tip device to that design.

According to an ninth aspect of the invention there is provided a method of use of an aircraft comprising a wing and a wing tip device at the tip of the wing, the wing tip device comprising a rib, wherein the method comprises flying the aircraft such that the rib is positioned in a span wise region of the wing tip device in which transonic flow occurs.

In embodiments of the invention the aircraft is flown at an operating cruise speed. According to a tenth aspect of the invention there is provided a method of use of an aircraft comprising a wing and a wing tip device at the tip of the wing, the wing tip device comprising a rib, wherein the method comprises flying the aircraft at a cruise speed in which the rib is positioned in a span wise region of the wing tip device in which transonic flow occurs. In embodiments of the invention the method comprises flying the aircraft at a cruise speed in which the rib is positioned at the span wise location at which a shock wave occurs. In embodiments of the invention the cruise speed is an operating cruise speed.

It will of course be appreciated that features described in relation to one aspect of the present invention may be incorporated into other aspects of the present invention. For example, the method of any aspect of the invention may incorporate any of the features described with reference to the apparatus of any aspect of the invention and vice versa.

Other preferred and advantageous features of the invention will be apparent from the following description.

DESCRIPTION OF THE DRAWINGS

Embodiments of the present invention will now be described by way of example only with reference to the accompanying drawings of which.

DETAILED DESCRIPTION

Figure 1:
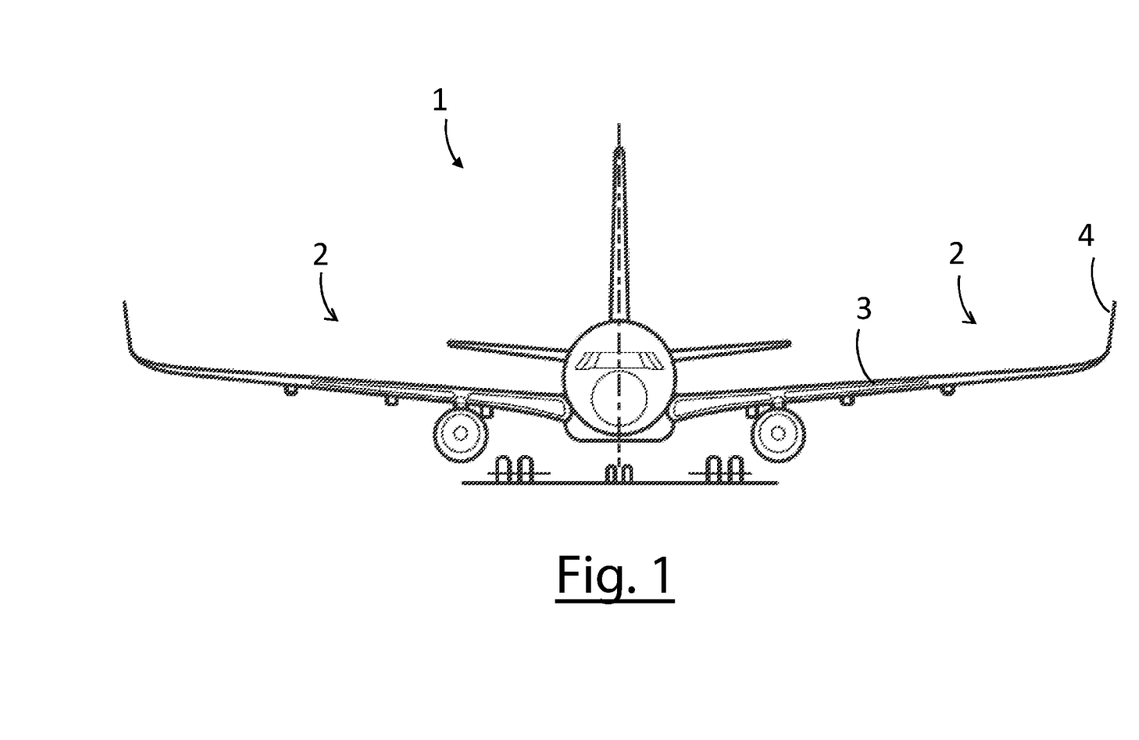
FIG. 1 is a front view of an aircraft according to an embodiment of the invention.

FIG. 1 illustrates an aircraft 1 according to an embodiment of the invention. The aircraft 1 is a commercial jet aircraft that comprises a pair of wing assemblies 2. The aircraft 1 is a passenger aircraft comprising a passenger cabin comprising a plurality of rows and columns of seat units for accommodating a multiplicity of passengers, in this case more than 50 passengers. The aircraft 1 is a powered aircraft and comprises a pair of engines, mounted under the wing assemblies 2, for propelling the aircraft 1.

Each wing assembly 2 comprises a wing 3 and a wing tip device in the form of a winglet 4 attached to the outboard tip of the wing 3.

Figure 2:
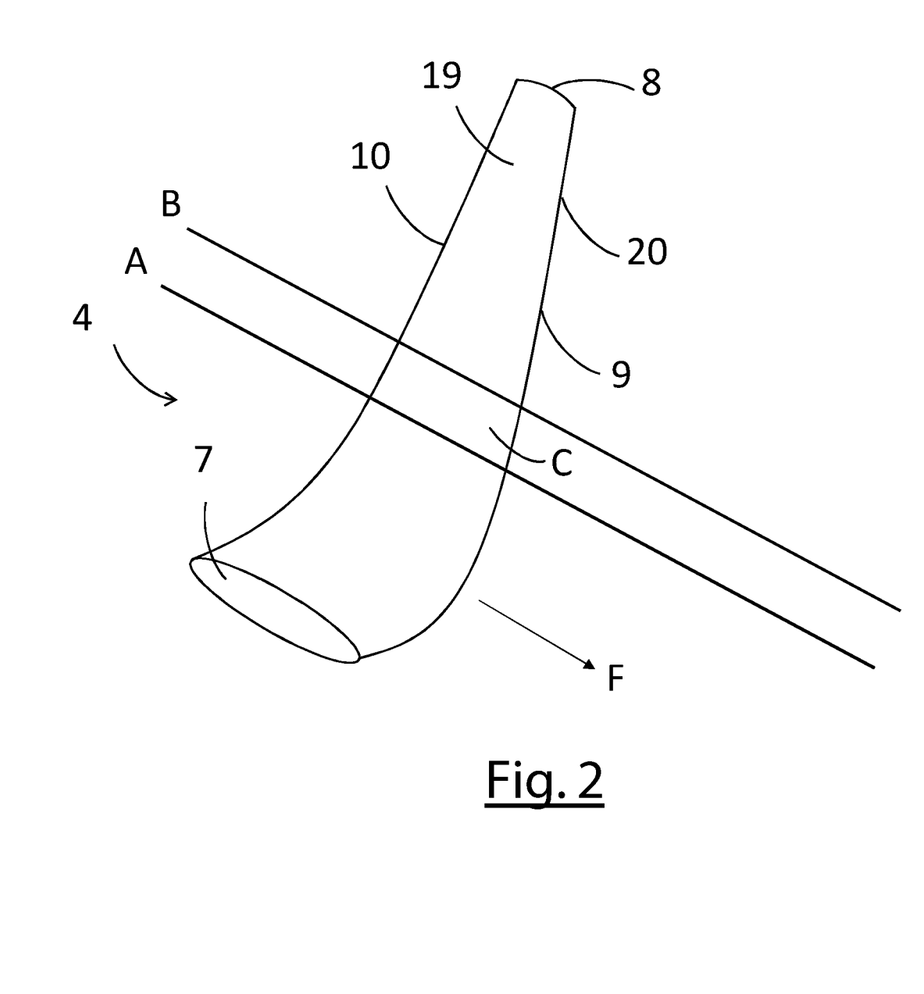
FIG. 2 is a front perspective view of a wing tip device of the port wing assembly of the aircraft shown in FIG. 1.

Referring to FIG. 2, the winglet 4 curves upwardly as it extends outboard in the span wise direction. The curvature of local dihedral increases from a low angle, or an angle of approximately zero, at or near the outboard end of the wing 3 and increases in the outboard direction. The outboard end of the winglet 4 is almost vertical but is inclined at a small angle with respect to the vertical plane. The winglet 4 is swept back.

The winglet 4 extends outboard in a span wise direction, from an inboard end 7, attached to the outboard tip of the wing 3, to a tip 8. The winglet 4 also extends in a chord wise direction from a leading edge 9 to a trailing edge 10. The winglet 4 is slightly cambered.

The leading and trailing edges 9, 10 of the winglet 4 are continuations of the leading and trailing edges of wing 3. Furthermore, the upper and lower surfaces of the winglet 4 are continuations of the upper and lower surfaces of the wing 3. Thus there is a smooth transition, from the wing 3 to the winglet 4.

It will be appreciated that there may be a smooth transition, even where there are changes in sweep or twist at the junction between the wing 3 and winglet 4. However, there may be no discontinuities at the junction between the wing 3 and winglet 4.

The winglet 4 is used to reduce the induced drag on the wing assembly 2, leading to improved fuel efficiency and reduced carbon emissions.

In the currently described embodiment, the aircraft 1 has an operating cruise speed range of Mach 0.80 to Mach 0.89 and an operating cruise altitude range of 30,000 feet to 43,000 feet.

It will be appreciated that operating cruise speed is a speed that the aircraft 1 is designed to cruise at in flight, i.e. at a constant altitude and constant speed, over long distances. The operating cruise altitude is the altitude that the aircraft 1 is designed to cruise at in flight, at the operating cruise speed. Flying at the operating cruise speed and operating cruise altitude provides the highest fuel efficiency for the operation of the aircraft 1.

In this regard, the operating cruise speed range is subsonic, but close to Mach 1. However, when the aircraft 1 is cruising at an operating cruise speed within this range, and at an operating cruise altitude within this range, the local flow on an outboard region of the winglet 4 is supersonic.

Figure 3:
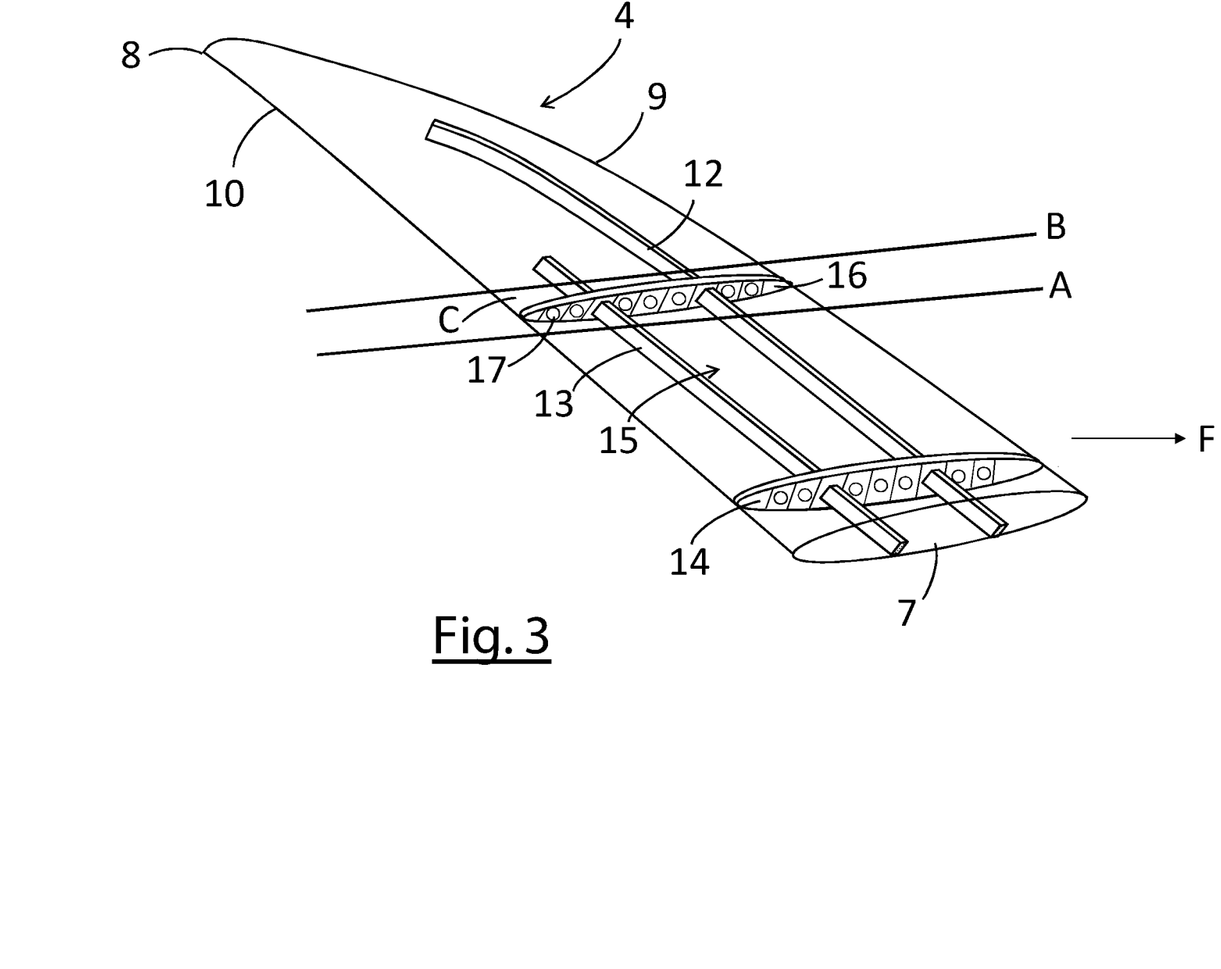
FIG. 3 is perspective view, from above, of the wing tip device shown in FIG. 2, where the upper wing skin has been omitted for illustrative purposes.

In this regard, referring to FIG. 3, when the aircraft 1 is cruising at an operating speed of Mach 0.85 (i.e. an operating speed within this range), and at an operating cruise altitude of 35,000 feet, the flow inboard of line A is subsonic, the flow outboard of line B is supersonic and the flow between lines A and B, in region C, is transonic. The transonic region C is approximately mid-way along the span of the winglet 4. Furthermore, a shock wave forms in the transonic region C.

The winglet 4 comprises upper and lower skins 19, 20 (see FIG. 2). The upper and lower skins 19, 20 provide the aerodynamic surfaces that are exposed to the air flow during flight.

The winglet 4 comprises an inboard rib 14 and front and rear spars 12, 13 (see FIG. 3). The inboard rib 14 and front and rear spars 12, 13 are internal (i.e. internal of the wing skins 19, 20) structural reinforcement members of the winglet 4. It will be appreciated that some internal components of the winglet 4 have been omitted for illustrative purposes (e.g. how each spar 12, 13 is connected to each rib 14, 16). Furthermore, it will be appreciated that each spar 12, 13 has been shown schematically and may have any suitable cross-sectional shape.

The front and rear spars 12, 13 are spaced apart in the chord wise direction and are located proximal the leading and trailing edges 9, 10 of the winglet 4 respectively. Each spar 12, 13 extend outboards, in the span wise direction, from the inboard end 7 of the winglet 4.

The inboard rib 14 is located towards the inboard end 7 of the winglet 4. It extends in the chord wise direction between the leading and trailing edges 9, 10 of the winglet 4 and, in the currently described embodiment, is aligned with the direction of flight F (see FIG. 3). The inboard rib 14 has an aerofoil shape that corresponds to that of the winglet 4 (at that span wise location) and is attached, along its length, to the upper and lower skins 19, 20.

The inboard rib 14 structurally links the front and rear spars 12, 13 together, towards their inboard ends. In this regard, the inboard rib 14 is attached to the front and rear spars 12, 13. In the currently described embodiment the inboard rib 14 is attached to each spar 12, 13, at its junction with the spar 12, 13, by riveting. However it will be appreciated that any suitable form of attachment may be used. The inboard rib 14 is provided with a plurality of circular cut-outs along its length, to reduce its weight.

The inboard rib 14 and spars 12, 13 provide part of a structural support frame for the winglet 4.

The winglet 4 also has an outboard rib 16 (it will be appreciated that this rib 16 is 'outboard' of the inboard rib 14). The outboard rib 16 is an internal (i.e. internal of the wing skins 19, 20) structural reinforcement member of the winglet 4. The outboard rib 16 extends in the chord wise direction between the leading and trailing edges 9, 10 of the winglet 4 and, in the currently described embodiment, is aligned with the direction of flight F (see FIG. 3). It will be appreciated that the direction of flight F is parallel to the direction that a central longitudinal axis of the aircraft 1 (i.e. of the fuselage of the aircraft 1) is pointing during flight (i.e. the 'direction of flight F' ignores any sideways motion of the aircraft). The outboard rib 16 is substantially aligned with the local chord wise direction of the winglet 4 (i.e. the chord wise direction at that span wise location).

The outboard rib 16 has an aerofoil shape that corresponds to that of the winglet 4 (at that span wise location) and is attached, along its length, to the upper and lower skins 19, 20.

The outboard rib 16 links the front and rear spars 12, 13 together, at that span wise location. In this regard, the outboard rib 16 is attached to the front and rear spars 12, 13 at its point of juncture with the spars 12, 13. In the currently described embodiment the outboard rib 16 is riveted to each spar 12, 13. However it will be appreciated that any suitable form of attachment may be used. The outboard rib 16 is provided with a plurality of circular cut-outs 17 along its length, to reduce its weight (see FIG. 3).

The rear spar 13 is long enough to provide an attachment point for the outboard rib 16. The outboard rib 16, the front and rear spars 12, 13 and the inboard rib 14 together form a structural support frame of the winglet 4, in the form of a structural box 15.

The outboard rib 16 is positioned in the transonic region C that occurs at the specific operating cruise speed and altitude which, in this embodiment, is Mach 0.85 and 35,000 feet. Specifically it is positioned at the span wise location at which the shock wave occurs, at this operating speed and altitude.

The outboard rib 16 is arranged to provide structural reinforcement against the pressure forces exerted on the winglet 4 at this location due to the transonic flow and, in particular, due to the shock wave.

It will be appreciated that the winglet 4 extends from its inboard end 7 to its outboard tip 8 along a span wise direction. The outboard rib 16 is arranged to increase the stiffness of the winglet 4 in a direction that is perpendicular to the mean camber line and to the local span wise direction at the span wise location of the rib 16. In this regard, the outboard rib 16 is arranged to increase the stiffness of the winglet 4 in the direction of the depth of the winglet 4.

The outboard rib 16 is also arranged to increase the stiffness of the winglet 4 in the chord wise direction (i.e. to prevent fore-aft deformation).

The outboard rib 16 is also arranged to increase the stiffness of the winglet 4 in the direction of twisting of the winglet 4 about the span wise direction in which the winglet 4 extends. In this regard, the outboard rib 16 is arranged to maintain the camber, i.e. the profile shape, of the winglet 4.

The outboard rib 16 is positioned at the location at which there would be significant interaction between the winglet 4 and the shock wave, i.e. where there would be significant pressure forces exerted on the winglet 4, due to the shock wave.

Positioning the outboard rib 16 in the transonic region C is advantageous in that it may provide structural reinforcement, particularly an increase in stiffness, against pressure forces exerted on the winglet 4 due to the transonic flow and, in particular, due to a shock wave occurring in flight, i.e. in the transonic region. This may reduce aero-elastic deformation in this region that would otherwise have occurred.

Furthermore, providing specific structural reinforcement in the transonic region C may provide a relatively light weight and compact way of reinforcing a winglet 4 against pressure forces exerted due to a shock-wave.

Figure 4:
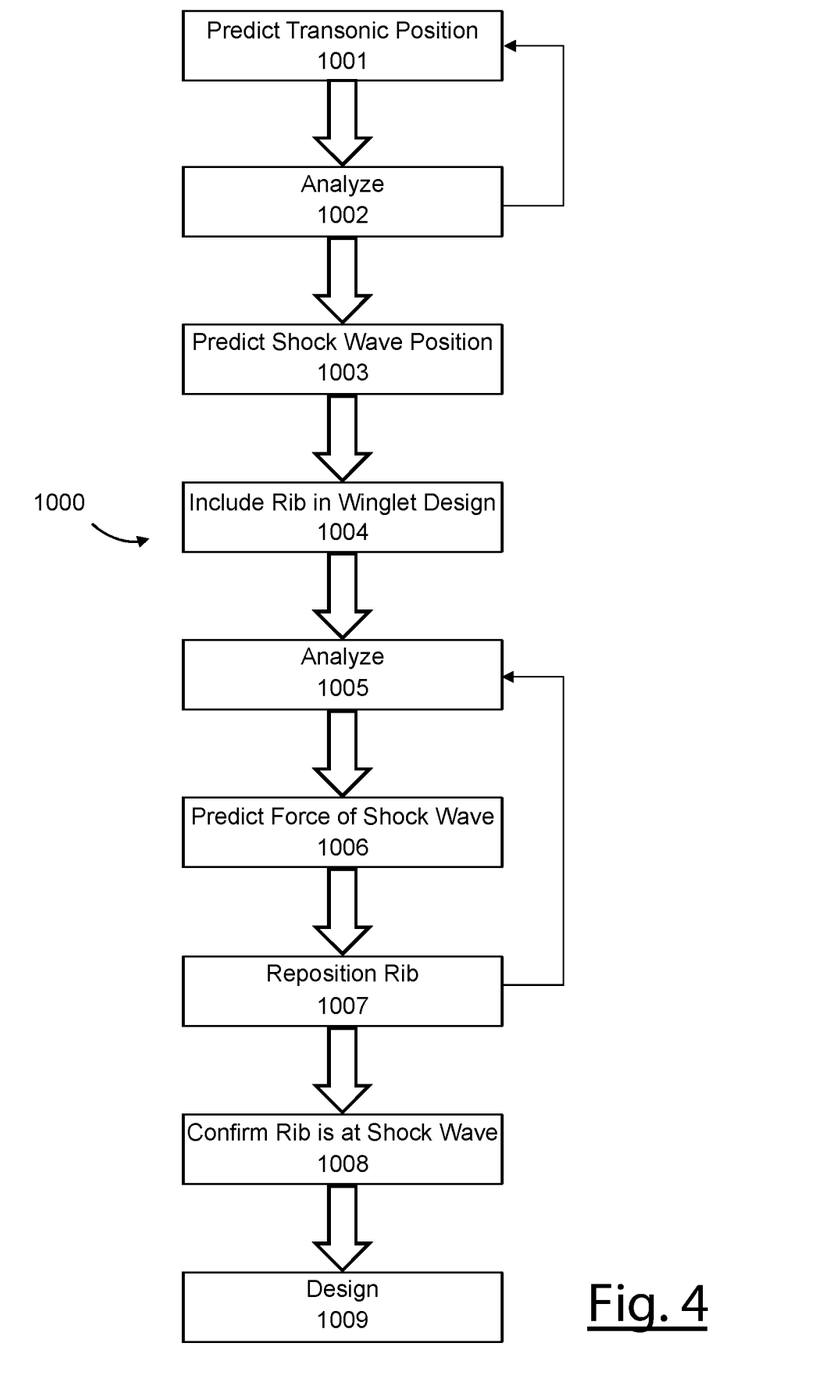
FIG. 4 is a flow-chart showing the steps of a method of manufacture of an aircraft, according to a further embodiment of the invention.

Referring to FIG. 4, a method of manufacture 1000 of the aircraft 1, according to a further embodiment of the invention, will now be described.

The method of manufacture 1000 comprises designing the aircraft 1 (steps 1001 to 1008) followed by the step of manufacturing the designed aircraft to that design (step 1009).

In more detail, the method comprises predicting the location of a shock wave on the winglet 4 during flight, at the operating cruise speed of Mach 0.85 and operating cruise altitude of 35,000 feet, without the outboard rib 16 in place. This comprises a computational fluid dynamics (CFD) analysis of a computational model of the winglet 4 (without the outboard rib 16 in place), to predict where transonic flow occurs on the winglet 4, specifically the span wise location of the shock wave, and to predict the aerodynamic forces exerted on the winglet 4 (step 1001).

A structural analysis (step 1005) is then performed, which may include the use of a Finite Element Analysis (FEA) model, to determine the structural response of the winglet 4 to the aerodynamic forces predicted in step 1001 (step 1002). The structural analysis may include an aero-elastic analysis. Since this structural response affects the flow over the winglet 4, the CFD analysis (step 1001) and structural analysis (step 1002) are performed iteratively, to converge to a solution that determines the span wise location of the shock wave (step 1003).

Once the location of the shock wave has been determined, the design (e.g. the computational model) of the winglet 4 is modified to include the outboard rib 16 at the span wise location of the shock wave predicted in step 1003 (step 1004).

A structural analysis is then performed, to determine the structural response of the winglet 4, with the outboard rib 16 in place, to the aerodynamic forces predicted in the previous CFD analysis. The structural analysis may include an aero-elastic analysis (step 1005).

The CFD analysis is repeated, taking into account the structural response predicted in the previous step, to predict the aerodynamic forces exerted on the winglet 4, and the position of the shockwave, with the outboard rib 16 in place (step 1006).

If the position of the shockwave predicted in the CFD analysis step (1006) is now different to its previously determined location, the location of the outboard rib 16 is revised to move it to the new span wise location of the shock wave (step 1007).

The structural analysis (step 1005), CFD analysis (step 1006) and the revision of the location of the outboard rib 16 to match that of the shock wave (step 1007) are iteratively repeated until a final solution is converged at that locates the outboard rib 16 at the span wise location of the shock wave (step 1008).

An aircraft to that design is then manufactured (step 1009).

Whilst the present invention has been described and illustrated with reference to particular embodiments, it will be appreciated by those of ordinary skill in the art that the invention lends itself to many different variations not specifically illustrated herein.

In the currently described embodiment, the wing tip device is an upwardly curved and swept back winglet 4. However, the winglet 4 could have different shapes. For example, it could be substantially flat in the span wise direction, it could be twisted, it might not be swept, it might be symmetrical instead of cambered, etc.

The outboard rib 16 may be used with any type of wing tip device that experiences a shock wave, including a winglet, a wing tip fence, a raked wing tip or a wing tip extension, for example.

In the currently described embodiment the outboard rib 16 is aligned in the flight direction. Alternatively, it may be inclined relative to the flight direction.

The aircraft may be any type of aircraft, including any air vehicle, such as a manned aircraft or a UAV. However, the aircraft may be a passenger aircraft.

The method of manufacture 1000 of an aircraft may omit the described iterations. However, it will be appreciated that this may produce a less optimal final design.

Steps 1001 to 1004 of the method may be replaced by placing the outboard rib 16 in an initial position in the design, for example at a 'best-guess' of where the shockwave is expected to be, based on previous experience and performing a CFD analysis on this design.

The outboard rib 16 may be located in the transonic region to provide structural reinforcement against pressure forces exerted on the wing tip device due to the transonic flow. However, the outboard rib 16 may be located at the span wise location of the shock-wave. Similarly, the method may be used to predict where transonic flow occurs on the winglet 4 and to locate the outboard rib 16 in the transonic region to provide structural reinforcement against pressure forces exerted on the wing tip device due to the transonic flow. However, the method may comprise locating the outboard rib 16 at the span wise location of the shock-wave.

It will be appreciated that the method of manufacture 1000 of the aircraft 1 includes a method of manufacture of the wing tip device 4. Similarly, it will be appreciated that the method of design of the aircraft (steps 1001 to 1008) includes a method of design of the wing tip device 4.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   a wing, and
   a wing tip device at a tip of the wing, wherein the wing tip device includes a rib positioned in a span wise region of the wing tip device where a shock wave occurs on the wing tip device when the aircraft is at a cruise altitude and a cruise speed.

2. The aircraft according to claim 1 wherein the cruise speed is in a range of Mach 0.80 to Mach 0.89 and the cruise altitude is in a range of 30,000 feet to 43,000 feet.

3. The aircraft according to claim 1, wherein the wing tip device comprises a pair of spars that are spaced apart in the chord wise direction and wherein the rib links the pair of spars.

4. The aircraft according to claim 1, wherein the rib forms an outboard rib and the wing tip device further comprises an inboard rib.

5. The aircraft according to claim 4, wherein the wing tip device includes a pair of spars lined by the inboard rib.

6. The aircraft according to claim 1, wherein the wing tip device comprises a winglet.

7. A wing tip device configured to attach to a tip of an aircraft wing, the wing tip device including a rib positioned in a span wise region of the wing tip device in which transonic flow occurs when the aircraft is in flight.

8. An aircraft comprising:
   a wing, and
   a wing tip device at a tip of the wing, wherein the wing tip device comprises:
      a pair of spars that are spaced apart in the chord wise direction,
      an inboard rib linking the pair of spars, and
      an outboard rib linking the pair of spars,
      wherein the outboard rib is positioned in a span wise region of the wing tip device in which a shock wave forms during transonic flow occurs when the aircraft is at a cruise altitude and a cruise speed.

9. The aircraft according to claim 8 wherein the cruise speed is in a range of Mach 0.80 to Mach 0.89 and the cruise altitude range of 30,000 feet to 43,000 feet.

10. A method of designing an aircraft including a wing and a wing tip device at a tip of a fixed wing portion of the wing, the method comprising:
    (i) predicting where a shock wave occurs on the wing tip device when the aircraft is at a cruise speed, and
    (ii) designing the wing tip device with a rib positioned in the span wise region of the wing tip device in which the predicted shock wave occurs.

11. The method of designing an aircraft according to claim 10 wherein step (i) comprises predicting where transonic flow occurs on the wing tip device when the rib is not in place and wherein the method comprises:
    (iii) repeating step (i) with the rib in place, to obtain a revised prediction;

(iv) repeating step (ii) to locate the rib at the revised location; and (v) iteratively repeating steps (iii) and (iv) until a final design is obtained.

12. The method of designing an aircraft according to claim 11 further comprising manufacturing an aircraft wherein a wing of the aircraft includes a wing tip device embodying the design of the wing tip device.

13. The method of claim 10, wherein the step of predicting a shock wave accurately predicts a span wise region of the wing tip device where a shock wave occurs on the wing tip device while the aircraft is flying at the cruise speed and cruise altitude.

14. A method of designing a wing tip device for an aircraft, the method comprising:
(i) predicting where a shock wave occurs on the wing tip device when the aircraft is at a cruise speed and at a cruise altitude, and (ii) designing the wing tip device with a rib positioned in a span wise region of the wing tip device in which the predicted shock wave flow occurs.

15. The method of designing a wing tip device according to claim 14 wherein step (i) comprises predicting where transonic flow occurs on the wing tip device when the rib is not in place and wherein the method comprises:
(iii) repeating step (i) with the rib in place, to obtain a revised prediction;

(iv) repeating step (ii) to locate the rib at the revised location; and (v) iteratively repeating steps (iii) and (iv) until a final design is obtained.

16. The method designing a wing tip device according to claim 14 and further comprising manufacturing a wing tip device embodying the design of the wing tip device.

17. The method of claim 14, wherein the cruise speed in a range of Mach 0.80 to Mach 0.89, and the cruise altitude is in a range of 30,000 feet to 43,000 feet.

* * * * *